No. 12,114. REISSUED MAY 19, 1903.

B. N. HAWES.

HYDROCARBON BURNER.

APPLICATION FILED DEC. 31, 1902.

2 SHEETS—SHEET 1.

Witnesses:

T. L. Moorman

Flora Pierce.

Inventor

Benjamin N. Hawes by Titus Wolfenson,

Attorney

No. 12,114.

REISSUED MAY 19, 1903.

B. N. HAWES.

HYDROCARBON BURNER.

APPLICATION FILED DEC. 31, 1902.

2 SHEETS—SHEET 2.

Witnesses;
G. L. Morrison
Flora Pierce.

Inventor
Benjamin N. Hawes
by Titus W. Johnson,
Attorney

No. 12,114. Reissued May 19, 1903.

UNITED STATES PATENT OFFICE.

BENJAMIN N. HAWES, OF NEW YORK, N. Y.

HYDROCARBON-BURNER.

SPECIFICATION forming part of Reissued Letters Patent No. 12,114, dated May 19, 1903.

Original No. 711,855, dated October 21, 1902. Application for reissue filed December 31, 1902. Serial No. 137,221.

*To all whom it may concern:*

Be it known that I, BENJAMIN N. HAWES, a citizen of the United States, residing in the city of New York, in the county and State of New York, have invented certain new and useful Improvements in Hydrocarbon-Burners, of which the following is a specification:

This invention relates to hydrocarbon-burners adapted for use in the fire-boxes of stoves, ranges, &c., to take the place of coal or other fuel usually used.

While it is my object to improve burners of this character generally in points of construction looking to the easy assembling of the parts and the more efficient operation with regard to the air circulation and admixture of the air with the oil-gas to produce perfect combustion and the utilization of the products of combustion, so that the greatest possible degree of heat can be obtained, my primary object is to improve the combustion or mixing chamber, so constructing the same that the air in passing through it will be heated to a high degree of heat before it reaches and mixes with the unburned oil-vapor and then passing it directly to points where it mixes with the vapor in its highly-heated state, thus more effectually continuing the rapid and perfect mixture of oil-gas and air and consequent combustibility of the mixture thus produced.

A further object is to improve the retort and superheating-pipe, so constructing the same that the oil in being fed to the burner will be made to pass into the retort and superheating-pipe in an upwardly direction from the point of entrance to the point where it is ignited, thus preventing the accumulation of more oil in said parts than will instantly vaporize, thereby eliminating the chance of slight explosions that frequently occur in burners of this class where oil is allowed to gather or accumulate in recesses below the point of supply.

Other objects and advantages resulting from the construction illustrated in the accompanying drawings will become apparent in the course of the following description.

Figure 1:
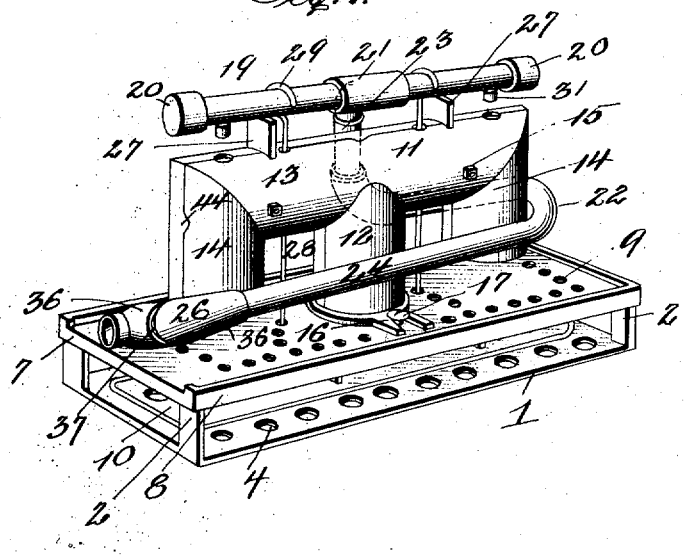
Figure 2:
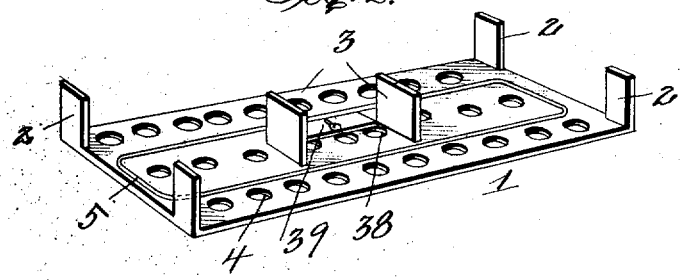
Figure 3:
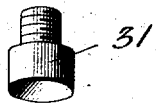
Figure 4:
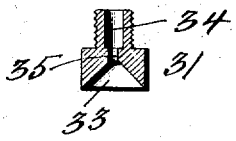
Figure 5:
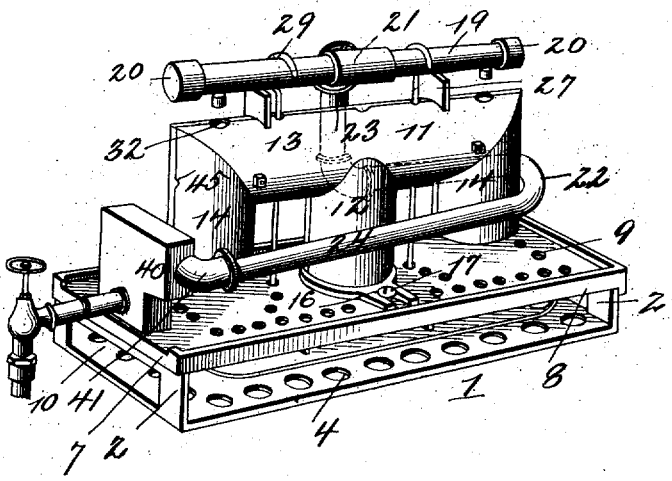
Figure 6:
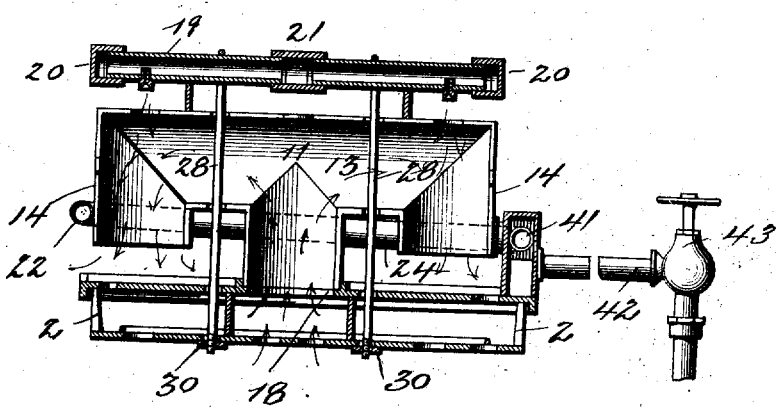

In the drawings, Figure 1 is a perspective view of my preferred form of burner complete, the oil-inlet pipe being omitted. Fig. 2 is a perspective view of the supporting-pan or base-plate of the burner. Fig. 3 is a perspective view of one of the jets. Fig. 4 is a central section of the jet. Fig. 5 is a perspective view of a burner, showing a slightly-modified form of retort; and Fig. 6 is a central vertical section of the burner shown in Fig. 5.

Referring to the drawings, the base of the burner is formed of the supporting-pan 1, having four upwardly-extending end pieces 2, one at each corner, and two oppositely-disposed central partitions 3, the purpose of which will presently become apparent. To permit the free passage of air through the bottom of the pan 1 when the same is in place in the fire-box of a stove, I provide a number of circular openings 4. This pan is further provided with a rib 5 to prevent the oil, before the same is ignited to heat the burner, from passing to the central row of holes.

The numeral 6 designates the top or deflecting plate, which rests upon the pieces 2 and is provided with short downwardly-projecting end flanges 7 and side flanges 8, which obviously prevent the top plate from sliding either laterally or longitudinally upon the pan when the parts are assembled. The deflecting-plate is provided with a number of air-holes 9, distributed promiscuously over its surface to permit the heated air from the space 10 to pass above the plate 6, where it is brought in contact and mixes with the heated air and gas in and below the mixing or combustion chamber 11, as will clearly appear farther along. The mixing-chamber can best be described as a plurality of tubes connected together and communicating with each other, a central vertical tube 12, horizontal tube 13, and end tubes 14, all of which are preferably of the same diameter and in the present instance preferably constructed in lateral halves firmly held together by two or more transverse bolts 15. The central tube is provided with a flange or rib adjacent to its bottom edge and two laterally-extending slotted ears 16 for the passage of short bolts 17, by which means the chamber is firmly held to the plate 6. As shown at 18, Fig. 6, the lower end of the tube 12 opens into the space 10 and the partitions 3 on the lower plate come on either side of the opening 18 for the purpose of directly conducting to the central tube a portion of the air passing in between the deflecting-plate 6 and plate 1 and the central tube and preventing the same from conflicting with air-currents more advantageously passing through the perforations in the top plate 6 to reunite above the said plate with the air that passes up through the central tube and through the mixing or combustion chamber.

The numeral 19 indicates the jet-pipe, which is closed at its ends, as indicated by the numeral 20, and provided with a central portion 21, in which is screwed the upper end of the superheating-pipe 22, which pipe is bent around the mixing-chamber, as shown, and formed into a vertical portion 23 and inclined portions 24 and 25, the end of the longer portion being screwed into the retort 26, which will presently be described. The jet-pipe rests upon two vertical pieces 27, cast integral with one or the other of the halves of the mixing-chamber, and is held thereto by vertical rods 28, bent to form hooks 29, which hook over the pipe, pass through the top plate, and are held to the bottom plate preferably by nuts 30, as clearly shown in Fig. 6. These rods also hold the deflecting-plate and pan together. The pipe is provided with jets 31, which are threaded and screwed into the pipe and when the parts are assembled come directly over circular openings 32, so located in the tube 13 as to bring them at about the center of the tube 14, so that the gas in passing with considerable force into the tube 14 will create a downdraft and draw the heated air up through the tube 12, thus quickening the passage of the air through the last-mentioned tube and space and side and ends of the pan 1. I have found in practice that excellent results are accomplished by forming the jets with flaring mouths, as 33, and chambers 34 and connecting the two by a hole or channel 35 of very much reduced diameter. This has the effect or tendency to atomize the oil when the same is first fed into the burner preparatory to vaporizing the same and to project the gas which later results from the vaporizing process in such a manner as to more readily and thoroughly mix it with air, and thus render it more combustible and capable of generating a flame of a very high degree of heat.

The retort 26 is formed in the main of two elbows 36, coupled by a pipe 37, the elbows where the pipe enters being swollen or enlarged and taper down to the size of the superheating-pipe where the elbows connect with said superheating-pipe and oil-inlet pipe. By forming the retort as shown—that is to say, with much more interior space than the same length of superheating-pipe—and arranging the retort and the superheating-pipe on an incline conducts the oil in coming into the burner constantly to a higher point than the oil-inlet, thus avoiding the possibility of the oil accumulating in the retort or superheating-pipe, all tendency of said oil when the pressure is relieved being to flow back out of the burner into the supply-pipe, where no vaporization takes place. By this arrangement I find that the possibility of slight explosions, which exert a backward pressure upon the supply-pipe and prevent a steady uniform flame, is entirely eliminated.

I preferably provide in the bottom of the supporting-pan a series of openings 38, which are more or less covered, as the case may require, by a sliding plate 39 for the obvious purpose of letting more or less air into the tube 12.

The numeral 44 indicates projections which I provide on one of the lateral halves of the mixing-chamber, said projections being preferably arranged one in each of the vertical pipes and one in the horizontal pipe 13, and these projections enter corresponding depressions 45 in the opposite halves of the mixing-chamber, so that when the halves are assembled they will fit accurately together and render the assembling of the parts easy and prevent their sliding upon each other when the burner is assembled.

The construction of the burner shown in Figs. 5 and 6 is identical with that shown in Figs. 1 and 2, with the exception that the retort is slightly modified, the same being formed with a reduced side portion 40, into which is screwed elbow 41, which in turn receives the inclined portion 24 of the supporting-pipe. Tapped into the face of this retort is the oil-supply pipe 42, controlled by an ordinary valve 43, through which the desired amount of oil is permitted to pass to said retort from a suitable oil-tank. (Not shown.) It will be noted in this construction that the point of oil-supply is below the end of the superheating-pipe and that said superheating-pipe is inclined from the point where it enters the retort to the point where it connects with the vertical section 23 of said superheating-pipe.

In operation oil is let into the generator or retort, from whence it passes through the superheating-pipe through jets and is ignited on the pan and burns till the retort and superheating-pipe become sufficiently hot to convert the oil therein into vapor, which will issue from the jets in the form of gas, when it is forced down into the hot air or mixing tubes 14, where it mixes with heated air coming through the tube 12, thus forming a fixed gas which burns in a thin blue flame perfectly free from smoke or soot. The fixed gas resulting from the admixture in the tubes 11 of the heated air and oil-vapor is carried or forced down through said tubes, where it comes in contact with the top of the deflecting-plate, where it is deflected and further mixes with air coming in through the perforations in the top plate and through the open sides and ends of the supporting-pan.

In burners of this character it is essential in order to obtain perfect combustion and a blue flame that the air before it is brought in contact with the gas as it issues from the jets be heated to a very high degree of heat, and while in some instances, depending largely upon the condition of the stove in which the burner is installed, it is desirable to use a top plate, such as I term the "deflecting-plate," with air-inlet openings therein, in other instances this is not necessary or desirable, as I have found in practice that air circulating beneath the deflecting-plate is heated sufficiently by contact with said plate to produce the desired results.

I claim—

1. A hydrocarbon-burner comprising a suitable base, a mixing-chamber supported on said base comprising a central hollow section open at its lower end, and formed with laterally and downwardly extended hollow sections communicating with the central section, said downwardly-extending sections being open at their lower ends and terminating above the base, a jet-pipe having jets discharging downward through the downwardly-extended hollow sections, and a superheating-pipe connected to the jet-pipe.

2. In a hydrocarbon-burner, the combination with a suitable base, a mixing-chamber supported on said base comprising a central hollow section open at its lower end, and formed with laterally and downwardly extended hollow sections, communicating with the central section, said downwardly-extending sections being open at their lower ends and terminating above the base, said laterally-extending section being provided with gas-inlet openings so arranged in said section that gas will be projected therethrough and through the downwardly-extending sections, a jet-pipe and a superheating-pipe connected to the jet-pipe, substantially as described.

3. In a hydrocarbon-burner, the combination with a suitable base, a mixing-chamber supported on said base comprising a central hollow section open at its lower end, and formed with laterally and downwardly extending hollow sections, communicating with the central section, said downwardly-extending sections being open at their lower ends and terminating above the base, said laterally-extending sections being provided with gas-inlet openings so arranged in said sections that the gas will be projected therethrough and through the downwardly-extending sections, a jet-pipe, a superheating-pipe having connection with the jet-pipe, and a retort arranged on an incline with relation to the superheating-pipe and having connection with said pipe, substantially as described.

4. In a hydrocarbon-burner, the combination with a suitable base having air-inlet openings therethrough, a mixing-chamber supported on said base comprising a central hollow section open at its lower end, and formed with laterally and downwardly extended hollow sections communicating with the central section, said downwardly-extending sections being open at their lower ends, and terminating above the base, a jet-pipe having jets discharging downward through the downwardly-extended hollow sections, and a superheating-pipe connected with the jet-pipe, substantially as described.

5. In a hydrocarbon-burner, the combination with a suitable base, having air-inlet openings therethrough, a mixing-chamber supported on said base comprising a central hollow section open at its lower end, and formed with laterally and downwardly extended hollow sections communicating with the central section, said downwardly-extending sections being open at their lower ends and terminating above the base, said laterally-extending section being provided with gas-inlet openings so arranged in said section that the gas will be projected therethrough and through the downwardly-extended sections, a jet-pipe and a superheating-pipe connected to the jet-pipe, substantially as described.

6. In a hydrocarbon-burner, the combination with a suitable base, having air-inlet openings therethrough, a mixing-chamber supported on said base and provided with a central tube, open at its lower end, and formed with laterally and downwardly extended tubes communicating with the central tube, said downwardly-extending tubes being open at their lower ends and terminating above the base, said laterally-extending tubes being provided with gas-inlet openings so arranged in said tube that the gas will be projected therethrough and through the downwardly-extending tubes, a retort, a jet-pipe, and a superheating-pipe connecting the retort and jet-pipe, substantially as described.

7. In a hydrocarbon-burner, the combination with a perforated base, a mixing-chamber supported on said base and formed of a central tube open at its lower end and laterally and downwardly extended tubes, the downwardly-extending tubes being open at their lower ends and terminating above the base and the laterally-extending tube being provided with gas-inlet openings through the vertical tubes, a jet-pipe supported above the mixing-chamber, an inclined superheating-pipe connected with the jet-pipe at one end, a retort connected with the other end of said superheating-pipe, said retort being of greater interior capacity than the same length of superheating-pipe, and arranged so that the fuel will pass upwardly through said retort to the superheating-pipe, substantially as and for the purpose set forth.

8. In a hydrocarbon-burner, the combination with a base comprising a perforated supporting-pan and a perforated top or deflecting plate, a mixing-chamber supported on the deflecting-plate, said chamber being formed of a central tube open at its lower end and laterally and downwardly extending tubes communicating with a central tube, said downwardly-extending tubes being open at their lower ends and terminating above the deflecting-plate, said laterally-extending pipes being provided with gas-inlet openings, a jet-pipe supported above the mixing-chamber and having jets adapted to project the gas downwardly through the downwardly-extended tubes, a superheating-pipe having one end connected with the jet-pipe, a retort connected to the other end of the superheating-pipe, said retort being of greater interior capacity than the same length of superheating-pipe, and so arranged that the oil will flow upwardly through the retort to the superheating-pipe, substantially as and for the purpose set forth.

9. In a hydrocarbon-burner, the combination with a base comprising a perforated supporting-pan cut away at its sides and ends, a perforated deflecting-plate supported upon said pan, a mixing-chamber supported on the deflecting-plate and formed of a central tube open at its lower end and laterally and downwardly projecting tubes communicating with the central tube, said downwardly-projecting tubes being open at their lower ends, and terminating above the deflecting-plate, and said laterally-extending tube being provided with gas-inlet openings through which the gas is projected through the downwardly-projecting tubes, a jet-pipe supported above the mixing-chamber, a superheating-pipe connected with the jet-pipe, and arranged to conduct the fuel in a generally upward direction, from the point of oil-supply, a retort connected with the other end of the superheating-pipe said retort having greater interior capacity than the same length of superheating-pipe, and so arranged with relation to the superheating-pipe that the oil passing therethrough will pass in an upwardly direction, substantially as and for the purpose set forth.

10. In a hydrocarbon-burner, the combination with a perforated base, of a mixing-chamber supported on said base, and formed in two lateral halves, one provided with projections and the other with depressions for the purpose set forth, and which halves when assembled, form a central tube open at its lower end and laterally and downwardly extending tubes communicating therewith, the downwardly-extending tubes being open at their lower ends and terminating above the deflecting-plate, a jet-pipe supported above the mixing-chamber, adapted to project gas downwardly through the same, a retort, and a superheating-pipe connecting the retort and jet-pipe, substantially as described.

11. In a hydrocarbon-burner, the combination with a perforated supporting-pan, a perforated deflecting-plate supported on said pan, a mixing-chamber supported on the deflecting-plate and formed of a central tube open at its lower end, and laterally and downwardly projecting tubes being open at their lower ends and terminating above the deflecting-plate, said laterally and downwardly projecting tubes being so connected with the central tube as to receive the gas or air from the said central tube, means for controlling the air passing through the base and the central tube, a jet-pipe above the mixing-chamber, a retort, and a superheating-pipe connecting the retort and the jet-pipe, substantially as described.

12. In a hydrocarbon-burner, the combination with a perforated supporting-pan, of a deflecting-plate supported on said pan, a mixing-chamber supported on the deflecting-plate and formed of a central tube open at its lower end and laterally and downwardly extending tubes connected with the central tube, the downwardly-extending tubes being open at their lower ends and terminating above the deflecting-plate, a jet-pipe adapted to project gas downwardly through the downwardly-projecting tubes, a retort, a superheating-pipe connecting the retort and jet-pipe, hooked rods connected with the jet-pipe, and extending downwardly through the base, whereby the jet-pipe is held in its proper position above the mixing-chamber, and the pan and deflecting-plate are held together, substantially as described.

13. A hydrocarbon-burner comprising a suitable base, a dome or mixing-chamber supported on said base containing a central air-passage and formed with laterally-extending hollow sections communicating with the central passage or duct and a pipe discharging gas downward through the dome, substantially as described.

14. A hydrocarbon-burner comprising a suitable base, a mixing-chamber or dome supported on said base comprising a hollow section having an air duct or passage therethrough and formed with laterally-extended hollow sections communicating with the central section, a jet-pipe having jets discharging downwardly through the lateral extension, and a superheating-pipe connected to the jet-pipe.

15. A hydrocarbon-burner comprising a suitable base, a mixing-chamber or dome supported on said base and having an air duct or passage opening through the base, and formed with laterally-extending sections having air ducts or passages communicating with the first-mentioned passage or duct, a gas-pipe arranged to discharge gas through the lateral extension whereby hot air is drawn through the first-mentioned passage or duct and mixed with the gas as it passes through the dome and a superheating-pipe connected to this discharge-pipe, substantially as described.

16. A hydrocarbon-burner comprising a suitable base, a dome or mixing-chamber supported on said base and formed with an air passage or duct therethrough and a laterally-extended hollow section communicating with the first-mentioned passage or duct, a gas-discharging device arranged to discharge gas through the dome and create a draft whereby hot air is drawn through the first-mentioned passage or duct, a superheating-pipe connected to the gas-discharging device, and a retort arranged on an incline with relation to the superheating-pipe and having connection with said pipe, substantially as described.

17. A hydrocarbon-burner comprising a suitable base, a mixing-chamber or dome supported on said base comprising a hollow section for the passage of air therethrough and formed with laterally-extended hollow section or sections communicating with the central section, a gas-discharging device arranged to discharge gas through the dome where it is mixed with hot air from the first passage or duct, and a superheating-pipe connected with said gas-discharging device, substantially as described.

In testimony whereof I affix my signature in the presence of two witnesses.

BENJAMIN N. HAWES.

Witnesses:
MARIE J. HAWES,
LUELLA SMITH.